US012306454B2

(12) United States Patent
Bauer et al.

(10) Patent No.: US 12,306,454 B2
(45) Date of Patent: May 20, 2025

(54) MONOLITHIC PULSE COMPRESSOR AND ASSOCIATED ADJUSTMENT METHOD

(71) Applicant: TRUMPF Laser GmbH, Schramberg (DE)

(72) Inventors: Dominik Bauer, Rottweil (DE); Aleksander Budnicki, Gundelfingen (DE); Raphael Scelle, Villingen-Schwenningen (DE); Michael Scharun, Schramberg (DE)

(73) Assignee: TRUMPF LASER GMBH, Schramberg (DE)

( * ) Notice: Subject to any disclaimer, the term of this patent is extended or adjusted under 35 U.S.C. 154(b) by 647 days.

(21) Appl. No.: 17/563,088

(22) Filed: Dec. 28, 2021

(65) Prior Publication Data
US 2022/0120993 A1 Apr. 21, 2022

Related U.S. Application Data

(63) Continuation of application No. PCT/EP2020/067284, filed on Jun. 22, 2020.

(30) Foreign Application Priority Data

Jul. 2, 2019 (DE) ..................... 10 2019 209 649.2

(51) Int. Cl.
*G02B 7/00* (2021.01)
*B23K 26/21* (2014.01)
(Continued)

(52) U.S. Cl.
CPC .............. *G02B 7/003* (2013.01); *B23K 26/21* (2015.10); *G02B 5/18* (2013.01); *H01S 3/0057* (2013.01); *H01S 3/067* (2013.01); *H01S 3/1106* (2013.01)

(58) Field of Classification Search
CPC .......... G02B 7/003; G02B 5/18; G02B 7/008; B23K 26/21; H01S 3/0057; H01S 3/067;
(Continued)

(56) References Cited

U.S. PATENT DOCUMENTS 7,409,125 B2 * 8/2008 Azimi ................. G02B 6/4226
385/33
8,395,981 B2  3/2013 Arai et al.
(Continued)

FOREIGN PATENT DOCUMENTS

CN         101441877 A    5/2009
CN         103091785 A    5/2013
(Continued)

*Primary Examiner* — Balram T Parbadia
*Assistant Examiner* — John Curtis Sipes
(74) *Attorney, Agent, or Firm* — LEYDIG VOIT & MAYER LTD.

(57) ABSTRACT

A pulse compressor includes a plurality of optical components. The plurality of optical components includes a diffraction grating. A first optical component of the optical components is fastened to base plate by at least first and second intermediate elements that are laser-welded to one another. The first intermediate element is fastened to the base plate and the second intermediate element is fastened to the optical component. A joining surface of the first and second intermediate elements is formed as a bearing recess and another joining surface is curved. At least the laser-welded joining surfaces of the first optical component, the base plate, and the first and second intermediate elements are formed from materials for which a difference in their coefficients of thermal expansion is less than 10e-6/K.

14 Claims, 3 Drawing Sheets

(51) Int. Cl.
*G02B 5/18* (2006.01)
*H01S 3/00* (2006.01)
*H01S 3/067* (2006.01)
*H01S 3/1106* (2023.01)

(58) Field of Classification Search
CPC ...... H01S 3/1106; H01S 3/005; H01S 3/0071; H01S 3/0014; H01S 3/06712; H01S 3/08036
See application file for complete search history.

(56) References Cited

U.S. PATENT DOCUMENTS

| | | | |
|---|---|---|---|
| 9,385,502 | B1 | 7/2016 | Plewicki et al. |
| 2004/0212802 | A1 | 10/2004 | Case et al. |
| 2004/0264891 | A1* | 12/2004 | Namiwaka ............ G02B 6/4237 385/93 |
| 2006/0056780 | A1 | 3/2006 | Takai et al. |
| 2007/0014317 | A1* | 1/2007 | Liu ...................... H01S 3/0057 372/100 |
| 2010/0067098 | A1* | 3/2010 | Hasegawa ............ H04L 27/223 359/325 |
| 2011/0129219 | A1* | 6/2011 | Mitsuhashi ........ G02B 6/29311 398/45 |
| 2013/0272334 | A1* | 10/2013 | Ryudo ................. G02B 6/4237 372/50.12 |
| 2019/0173257 | A1 | 6/2019 | Bauer et al. |
| 2022/0120993 | A1 | 4/2022 | Bauer et al. |

FOREIGN PATENT DOCUMENTS

| | | | | |
|---|---|---|---|---|
| CN | 114144948 | A | 3/2022 | |
| DE | 102016213561 | A1 | 1/2018 | |
| EP | 2816386 | A1 | 12/2014 | |
| JP | S62178913 | A | 8/1987 | |
| JP | 10260339 | A * | 9/1998 | |
| JP | 2004286966 | A | 10/2004 | |
| JP | 2007109962 | A | 4/2007 | |
| JP | 2008250002 | A | 10/2008 | |
| WO | WO-03089971 | A2 * | 10/2003 | ......... G02B 26/0875 |
| WO | WO 2012013512 | A1 | 2/2012 | |

* cited by examiner ial Application No. PCT/EP2020/067284 (WO 2021/001185 A1), filed on Jun. 22, 2020, and claims benefit to German Patent Application No. DE 10 2019 209 649.2, filed on Jul. 2, 2019. The aforementioned applications are hereby incorporated by reference herein.

MONOLITHIC PULSE COMPRESSOR AND ASSOCIATED ADJUSTMENT METHOD

CROSS REFERENCE TO RELATED APPLICATIONS

This application is a continuation of International Application No. PCT/EP2020/067284 (WO 2021/001185 A1), filed on Jun. 22, 2020, and claims benefit to German Patent Application No. DE 10 2019 209 649.2, filed on Jul. 2, 2019. The aforementioned applications are hereby incorporated by reference herein.

FIELD

The disclosure relates to a pulse compressor comprising multiple optical components, at least one of which is a diffraction grating, and also relates to a method for adjusting and fastening at least one optical component of the pulse compressor.

BACKGROUND

Pulse compressors are used in so-called Chirped Pulse Amplification (CPA), in order to generate laser pulses with maximum pulse peak powers up to the petawatt range. Such high peak powers cannot be generated directly by laser beam sources because the gain media of the laser would usually be destroyed by non-linear optical effects and such like. Therefore, before amplification, laser pulses are stretched in time in pulse stretchers, which reduces their pulse peak power, and then they pass through a gain medium. After amplification, the laser pulses are compressed and then have a correspondingly higher power density.

On account of the high intensities occurring, compressors typically consist of free jet components. In the case of grating compressors based on diffraction gratings, the laser light is typically diffracted four times. For example, there are designs with a single grating, through which the laser light passes four times, with two gratings (e.g. a Treacy compressor) and with four gratings.

The optical components of the compressor are typically held and adjusted by mechanical holders. Very great stretching and compression factors are needed to generate high pulse energies. For lasers based on CPA technology, this requires a very high optomechanical stability of the pulse compressor, which is difficult to achieve with mechanical holders.

SUMMARY

In an embodiment, the present disclosure provides a pulse compressor. The pulse compressor includes a plurality of optical components. The plurality of optical components includes a diffraction grating. A first optical component of the optical components is fastened to base plate by at least first and second intermediate elements that are laser-welded to one another. The first intermediate element is fastened to the base plate and the second intermediate element is fastened to the optical component. A joining surface of the first and second intermediate elements is formed as a bearing recess and another joining surface is curved. At least the laser-welded joining surfaces of the first optical component, the base plate, and the first and second intermediate elements are formed from materials for which a difference in their coefficients of thermal expansion is less than 10e-6/K.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
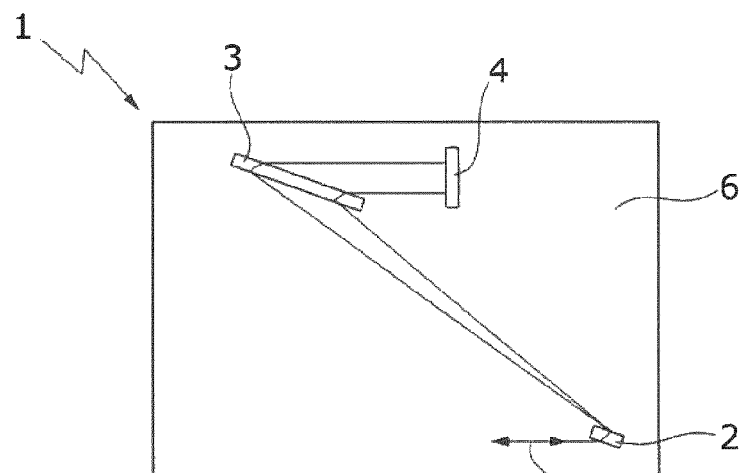
FIGS. 1a, 1b schematically show a pulse compressor in a plan view from above (FIG. 1a) and in a perspective side view (FIG. 1b)

The present disclosure provides for further increasing the optomechanical stability in the case of a pulse compressor of the type mentioned at the beginning.

The present disclosure provides, in a first variant, a pulse compressor in which at least one of the optical components is fastened to the base plate by at least two intermediate elements laser-welded to one another, the one, first intermediate element being fastened to the base plate and the other, second intermediate element being fastened to the optical component, or vice versa, and one of the joining surfaces of the intermediate elements being formed as a bearing recess and the other joining surface being formed as curved, in particular convexly curved or in the form of a segment of a sphere, at least the laser-welded joining surfaces of the at least one optical component, the base plate and the intermediate elements being formed from materials for which the difference in their coefficients of thermal expansion is less than $10e^{-6/K}$. The coefficient of thermal expansion is understood as meaning the thermal longitudinal expansion coefficient or coefficient of linear thermal expansion.

In a second variant, it is provided that at least one of the optical components is fastened to the base plate by at least three intermediate elements laser-welded to one another, a first and a second intermediate element being fastened to the base plate and a third intermediate element being fastened to the optical component, or vice versa, and the joining surfaces of the first and the second intermediate element that are lying against the third intermediate element and/or the joining surface of the third intermediate element that is lying against the first and the second intermediate element being curved, and that at least the laser-welded joining surfaces of the at least one optical component, the base plate and the intermediate element are formed from materials for which the difference in their coefficients of thermal expansion is less than $10e^{-6/K}$.

According to the disclosure, the at least one optical component, the base plate and/or the at least one intermediate element are fastened without adhesive to form a monolithic optical assembly, in particular are laser-welded, e.g. by means of USP (ultra-short pulse) welding with laser pulses in the range of a few picoseconds or less. The materials may be, for example, sapphire, BK7 or Zerodur, all of which have a coefficient of expansion less than $10e^{-6/K}$. The use of such materials prevents the occurrence of thermally induced stresses within the assembly and results in high thermal stability of the assembly, and consequently in high optomechanical stability of the pulse compressor. This in turn allows higher stretching factors and higher pulse energy scalings. Before the laser welding, the optical components of the pulse compressor have been precisely adjusted in relation to one another and then laser-welded to one another in this adjustment position.

Preferably at least some, in particular all, of the optical components of the pulse compressor are each fastened to the base plate by means of at least two or three intermediate elements which are laser-welded to the optical component and/or to the base plate, at least the laser-welded joining surfaces of the optical components, the base plate and the intermediate elements being formed from materials for which the difference in their coefficients of thermal expansion is less than $10e^{-6/K}$.

In a preferred embodiment, at least one of the optical components is formed completely from the same, non-absorbing material, in particular quartz glass or crystal. Alternatively, the laser-welded joining surface of at least one of the optical components may however also be formed on a substrate of the optical component which is laser-welded to the base plate and/or to the intermediate elements. The optical element may be, for example, a reflective diffraction grating, the substrate of which is provided with a reflective coating. Correspondingly, the base plate and the intermediate elements may each be formed completely from the same material, in particular from quartz glass or crystal.

Particularly preferably, all of the optical components are each fastened to the base plate by means of the intermediate elements, which in turn are laser-welded to the optical component and/or to the base plate. The intermediate elements can be used for aligning the optical components exactly in relation to one another on the base plate before fastening, e.g. by displacing and/or tilting.

For the optical component to lie against the intermediate element or the intermediate element to lie against the base plate over a large surface area, the intermediate element preferably lies against the optical component or against the base plate with a flat joining surface.

For a tilting adjustment of an optical component, the optical component is fastened to the base plate by means of at least two intermediate elements that are laser-welded to one another. The one, first intermediate element is laser-welded to the base plate and the other, second intermediate element is laser-welded to the optical component, or vice versa. The joining surface of the one-part or multi-part first intermediate element that is lying against the second intermediate element is formed as a, for example, circular, conical, V-shaped or spherical cap-shaped bearing recess and the joining surface of the second intermediate element that is lying against the first intermediate element is formed in the form of a segment of a sphere, in order to align the two intermediate elements in a desired tilting position before the laser welding.

For adjusting the height and tilt of an optical component, the optical component is fastened to the base plate by means of at least three intermediate elements fastened to one another, in particular laser-welded. A first and a second intermediate element are fastened, in particular laser-welded, to the base plate and a third intermediate element to the optical component, or vice versa. The joining surfaces of the first and the second intermediate element that are lying against the third intermediate element and/or the joining surface of the third intermediate element that is lying against the first and the second intermediate element are curved. By changing the distance between the first and the second intermediate element, the height of the third intermediate element, and consequently also the distance between the optical component and the base plate, can be varied. Advantageously, the joining surfaces of the first and the second intermediate element that are lying against the third intermediate element are each formed as a sloping surface and the joining surface of the third intermediate element that is lying against the first and the second intermediate element is formed as convexly curved, in particular semi-cylindrical.

For a stable welded connection, the optical components, the intermediate elements and the base plate are laser-welded to one another if at all possible over the entire length of their joining line.

The disclosure also relates to a method for adjusting and fastening at least one optical component of a pulse compressor comprising multiple optical components, at least one of which is a diffraction grating, on a base plate of the pulse compressor by means of two intermediate elements, one of the joining surfaces of the intermediate elements being formed as a bearing recess and the other joining surface being formed as curved, in particular convexly curved or in the form of a segment of a sphere, with the following method steps:

laser welding the first intermediate element to the base plate and the second intermediate element to the optical component;

adjusting the optical component into a desired tilting position with respect to the base plate by turning the joining surfaces lying against one another; and laser welding the two intermediate elements to one another in the desired tilting position;

or with the following method steps:

laser welding the second intermediate element to the optical component;

adjusting the optical component into a desired tilting position in relation to the first intermediate element by turning the joining surfaces lying against one another;

laser welding the two intermediate elements to one another in the desired tilting position;

adjusting the optical component on the base plate into a desired position with respect to the base plate; and laser welding the first intermediate element to the base plate in the desired position, at least the laser-welded joining surfaces of the at least one optical component, the base plate and the intermediate elements being formed from materials for which the difference in their coefficients of thermal expansion is less than $10e^{-6/K}$.

In an alternative variant, the disclosure provides a method for adjusting and fastening at least one optical component of a pulse compressor comprising multiple optical components, at least one of which is a diffraction grating, on a baseplate of the pulse compressor by means of three intermediate elements, the joining surfaces of the first and the second intermediate element that are lying against the third intermediate element and/or the joining surface of the third intermediate element that is lying against the first and the second intermediate element being curved, with the following method steps:

placing a first and a second intermediate element onto the base plate and laser welding a third intermediate element to the optical component, or vice versa;

adjusting the optical component into a desired tilting position with respect to the base plate by turning the third intermediate element lying against the first and the second intermediate element and/or adjusting the optical component into a desired height position with respect to the base plate by changing the distance between the first and the second intermediate element; and laser welding the first and the second intermediate element to the base plate and to the third intermediate element in the desired tilting or height position, at least the laser-welded joining surfaces of the at least one optical component, the base plate and the intermediate elements being formed from materials for which the difference in their coefficients of thermal expansion is less than $10e^{-6/K}$.

Further advantages and advantageous refinements of the subject matter of the disclosure are evident from the description and the drawings. Similarly, the features mentioned above and those still to be further presented can be used in each case individually or together in any desired expedient combinations. The embodiments shown and described should not be understood as an exhaustive enumeration, but rather are of exemplary character.

The pulse compressor 1 shown in FIG. 1 is designed as a so-called Treacy compressor, with two diffraction gratings 2, 3 and with a prism 4. These optical components 2-4 are each fastened by means of three intermediate elements 5a-5c on a preferably transparent base plate 6. The three optical components 2-4, the intermediate elements 5a-5c and the base plate 6 may all be formed from the same, non-absorbing material, in particular from quartz glass, or from different materials for which the difference in their coefficients of thermal expansion is less than 10e-6/K. The different materials may be, for example, sapphire, BK7 or Zerodur, all of which have a coefficient of expansion less than 10e-6/K. Advantageously, the optical components 2-4, the intermediate elements 5a-5c and the base plate 6 are formed from materials which have a coefficient of thermal expansion less than 10e-6/K.

Figure 2:
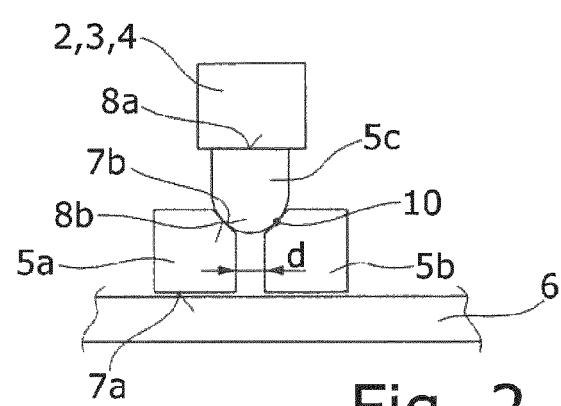
FIG. 2 shows a three-part substructure for the optical components of the pulse compressor shown in FIG. 1b.

As shown in FIG. 2, a first and a second intermediate element 5a, 5b each lie with a flat, in FIG. 2 lower, joining surface 7a on the base plate 6 and are laser-welded to the base plate 6 next to one another at the distance d. The third intermediate element 5c lies with a flat, in FIG. 2 upper, joining surface 8a against the optical component 2-4 and is laser-welded to the optical component 2-4. The joining surfaces 7b of the first and the second intermediate element 5a, 5b that are lying against the third intermediate element 5c are formed as sloping surfaces and the joining surface 8b of the third intermediate element 5c that is lying against the first and the second intermediate element 5a, 5b is formed as semi-cylindrical. The intermediate elements 5a-5c lying against one another are likewise laser-welded to one another.

Before the laser welding, the optical components 2-4 have been precisely adjusted in relation to one another on the base plate 6 by means of the intermediate elements 5a-5c. The first and the second intermediate element 5a, 5b may be displaced as desired with their flat joining surfaces 7a on the base plate 6 and be turned as desired about a vertical axis, in order in this way to align the optical components 2-4 correctly in relation to one another or in relation to the base plate 6. By changing the distance d between the first and the second intermediate element 5a, 5b, the distance in height of the third intermediate element 5c, and consequently also the distance in height of the optical components 2-4, in relation to the base plate 6 can be varied. The two sloping surfaces 7b of the first and the second intermediate element 5a, 5b form a rotary bearing in the form of a V-shaped groove for the semi-cylindrical joining surface 8b of the third intermediate element 5c, whereby the optical component 2-4 can be adjusted about both horizontal axes. These degrees of freedom of adjustment have the effect in particular that the diffraction gratings 2, 3 can be adjusted in the direction of the optical axis to a certain optimum length position.

As soon as they have been adjusted correctly, the optical components 2-4, the intermediate elements 5a-5c and the base plate 6 are laser-welded to one another in this adjustment position and form a monolithic optical assembly. The same material or the different materials with similar coefficients of thermal expansion prevent(s) the occurrence of thermally induced stresses within the assembly in the parts to be joined that are welded to one another and result(s) in maximum thermal, and consequently optomechanical, stability of the pulse compressor 1. Because of its minimized maladjustment, this monolithic pulse compressor 1 allows higher stretching factors and higher pulse energy scalings.

The laser welding of two parts to be joined preferably takes place by means of ultra-short pulse (USP) welding with laser pulses in the range of a few picoseconds or lower, and ideally over the entire length of their joining line. In FIG. 2, the weld seam between the second and the third intermediate element 5b, 5c is denoted by 10.

Unlike as described above, one or more optical component(s) 2-4 may also be welded to the base plate 6 directly, i.e. without intermediate elements. Also, the optical components 2-4 do not have to be formed completely from the same material, but it is sufficient if only the laser-welded substrate of the optical components 2-4 is formed from materials for which the difference in their coefficients of thermal expansion is less than 10e-6/K, in particular from the same material. Thus, for example, the diffraction grating 2, 3 may be formed as a reflective diffraction grating with a substrate and a metallic coating applied to it.

In an oscillator, e.g. in a mode-locked fiber laser, a seed pulse is generated (ps/fs), and is then stretched over time, e.g. by using a fiber stretcher. This stretched pulse is amplified in an amplifier or an amplifier chain (rod, disk, slab or fiber) and then compressed in time with the aid of the pulse compressor 1. The laser pulse 11 entering the pulse compressor 1 is diffracted at the two reflective diffraction gratings 2, 3. Different wavelengths of the laser pulse 11 are in this case diffracted at different angles, resulting in a different optical path for the spectral components of the laser pulse 11. The then time-compressed laser pulse 11 leaves the pulse compressor 1 with a correspondingly higher power density.

Figure 1B:
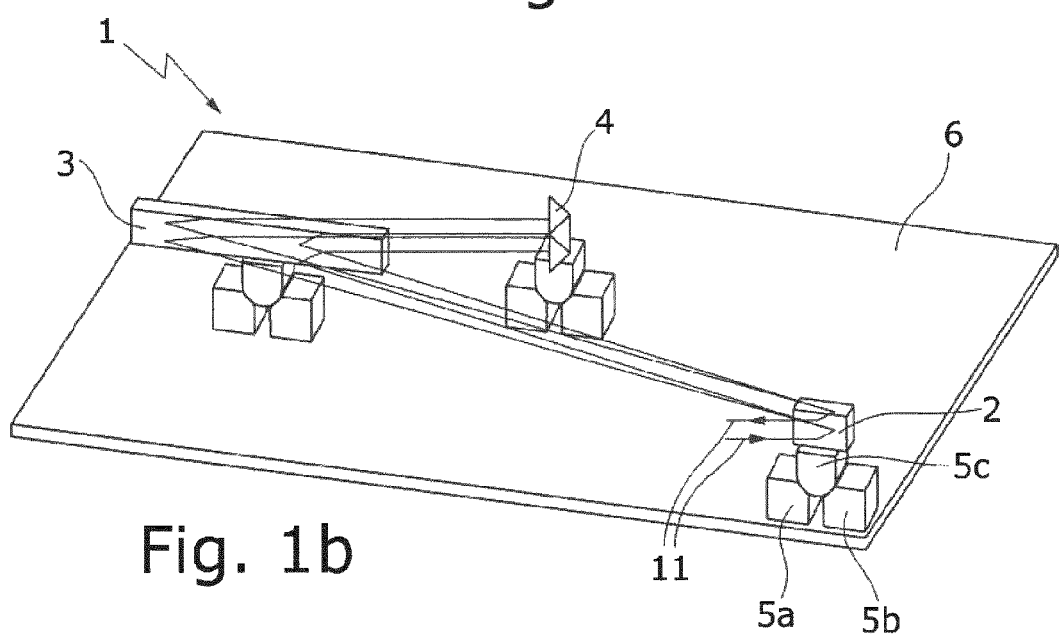
Figure 3A:
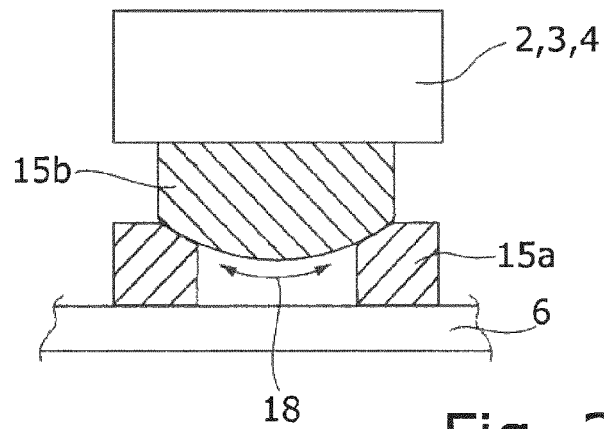
FIGS. 3a, 3b show a two-part substructure for the optical components of the pulse compressor shown in FIG. 1b in the assembled state (FIG. 3a) and in a representation as individual parts (FIG. 3b)
Figure 3B:
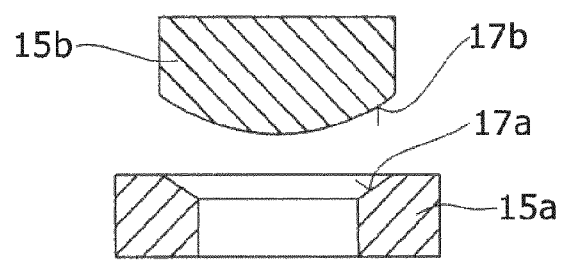

In FIGS. 3a, 3b, a two-part substructure for the optical components 2-4 of the pulse compressor shown in FIG. 1b is shown. The optical component 2-4 is fastened to the base plate 6 by means of two intermediate elements 15a, 15b laser-welded to one another, the one, first intermediate element 15a being laser-welded to the base plate 6 and the other, second intermediate element 15b being laser-welded to the optical component 2-4. The joining surface 17a of the first intermediate element 15a that is lying against the second intermediate element 15b is formed conically in the direction of the base plate 6 and the joining surface 17b of the second intermediate element 15b that is lying against the first intermediate element 15a is formed in the form of a segment of a sphere. The joining surfaces 17a, 17b lying against one another form a rotary bearing, in order to align the two intermediate elements 15a, 15b with respect to one another—and consequently the optical component 2-4 with respect to the base plate 6—into a desired tilting position (double-headed arrow 18) before the laser welding. Instead of conical, the joining surface 17a may also be designed as V-shaped, spherical cap-shaped or as a circular bearing opening.

Figure 4A:
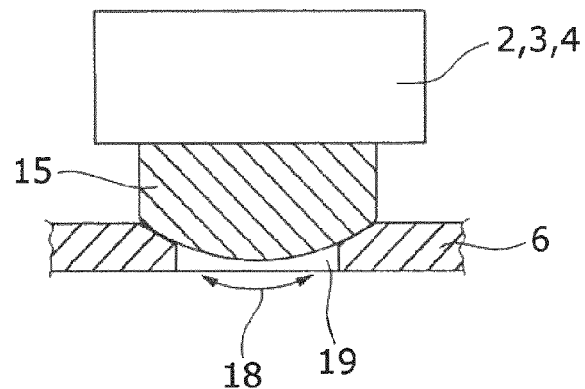
FIGS. 4a, 4b show a further substructure for the optical components of the pulse compressor shown in FIG. 1b in the assembled state (FIG. 4a) and in a representation as individual parts (FIG. 4b).
Figure 4B:
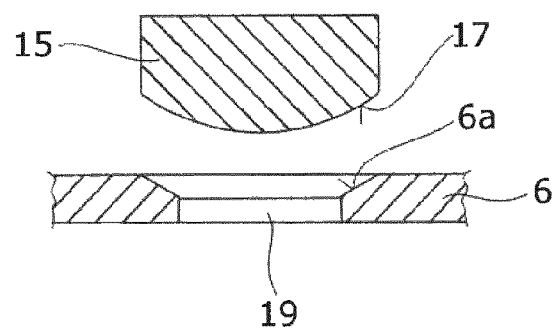

In FIGS. 4a, 4b, a further substructure for the optical components 2-4 of the pulse compressor shown in FIG. 1b is shown. The optical component 2-4 is fastened to the base plate 6 by means of a single intermediate element 15, which is laser-welded to the base plate 6 and to the optical component 2-4. The joining surface 17 of the intermediate element 15 that is lying against the base plate 6 is formed in the form of a segment of a sphere and is pivotably mounted in a bearing recess 19 of the base plate 6 (double-headed arrow 18). The joining surfaces 6a, 17 of the base plate 6 and of the intermediate element 15 form a rotary bearing, in order to align the base plate 6 and the intermediate element 15 with respect to one another in a desired tilting position before the laser welding. In order to form a linear joining contact, the bearing recess 19 may be designed as conical, V-shaped or else as a circular bearing opening. In order to form a joining contact over a large surface area, the bearing recess 19 may be formed as spherical cap-shaped.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A pulse compressor comprising:
   a plurality of optical components, the plurality of optical components including a diffraction grating,
   wherein a first optical component of the optical components is fastened to a base plate by at least a first intermediate element and a second intermediate element that are laser-welded to one another at a first joining surface of the first intermediate element and a second joining surface of the second intermediate element,
   wherein the first intermediate element is integral with the base plate or is laser-welded to the base plate at a third joining surface of the first intermediate element and a joining surface of the base plate, and the second intermediate element is laser-welded to the optical component at a fourth joining surface of the second intermediate element and a joining surface of the optical component,
   wherein one of the first joining surface of the first intermediate element and the second joining surface of the second intermediate element is formed as a bearing recess, and another one of the first joining surface and the second joining surface is curved, and
   wherein at least the joining surface of the first optical component, the joining surface of the base plate, the first joining surface and the third joining surface of the first intermediate element, and the second joining surface and the fourth joining surface of the second intermediate element are formed from materials for which a difference in their coefficients of thermal expansion is less than $10e^{-6}/K$.

2. The pulse compressor as claimed in claim 1, wherein at least one additional optical component of the optical components is fastened to the base plate by at least two additional intermediate elements which are laser-welded to the additional optical component and/or to the base plate, wherein a joining surface the at least one additional optical component, the joining surface of the base plate, and joining surfaces of the at least two additional intermediate elements are formed from materials for which a difference in their coefficients of thermal expansion is less than $10e^{-6}/K$.

3. The pulse compressor as claimed in claim 1, wherein the joining surface of the first optical component, the joining surface of the base plate, the first joining surface and the third joining surface of the first intermediate element, and the second joining surface and the fourth joining surface of the second intermediate element are formed from a same material.

4. The pulse compressor as claimed in claim 3, wherein at least the joining surface of the first optical component, the joining surface of the base plate, the first joining surface and the third joining surface of the first intermediate element, and the second joining surface and the fourth joining surface of the second intermediate element are formed from quartz glass or quartz crystal.

5. The pulse compressor as claimed in claim 1, wherein the first optical component, the base plate, the first intermediate element, and the second intermediate element are formed completely from a same material.

6. The pulse compressor as claimed in claim 5, wherein the first optical component, the base plate, and/or the first intermediate element and the second intermediate element are formed completely from quartz glass or quartz crystal.

7. The pulse compressor as claimed in claim 1, wherein the joining surface of the first optical component is formed on a substrate of the first optical component.

8. The pulse compressor as claimed in claim 1, wherein the fourth joining surface of the second intermediate element is flat and lies against the optical component, and/or the third joining surface of the first intermediate element is flat and lies against the base plate.

9. The pulse compressor as claimed in claim 1, wherein the first joining surface of the first intermediate element, which lies against the second joining surface of the second intermediate element, is formed as a conical surface, and the second joining surface of the second intermediate element that lies against the first intermediate element is convexly curved.

10. The pulse compressor as claimed in claim 1, wherein the first optical component, the first intermediate element, the second intermediate element, and the base plate are laser-welded to one another over an entire length of a joining line.

11. The pulse compressor as claimed in claim 1, wherein the first optical component is fastened to the base plate additionally by a third intermediate element, wherein the first intermediate element, the second intermediate element, and the third intermediate element are laser-welded to one another, wherein the third intermediate element is laser-welded to the base plate.

12. The pulse compressor as claimed in claim 11, wherein the first joining surface of the first intermediate element and a fifth joining surface of the third intermediate element that lie against the second intermediate element are curved, and/or the second joining surface of the second intermediate element that lies against the first intermediate element and the third intermediate elements is curved.

13. A method for adjusting and fastening at least a first optical component of a pulse compressor comprising multiple optical components, at least one of which is a diffraction grating, on a base plate of the pulse compressor, the method comprising:
adjusting and fastening the first optical component by:
laser welding a first intermediate element to the base plate at a first joining surface of the first intermediate element and a joining surface of the base plate;
laser welding a second intermediate element to the first optical component at a second joining surface of the second intermediate element and a joining surface of the first optical component;
positioning the second intermediate element with the first optical component laser-welded thereto against the first intermediate element with the base plate laser-welded thereto;
adjusting the first optical component into a desired tilting position with respect to the base plate by turning the second intermediate element with respect to the first intermediate element; and
laser welding the first intermediate element and to the second intermediate element in the desired tilting position at a third joining surface of the first intermediate element and a fourth joining surface of the second intermediate element; or
adjusting and fastening the first optical component by:
laser welding the second intermediate element to the first optical component at the second joining surface of the second intermediate element and the joining surface of the first optical component;
positioning the second intermediate element with the first optical component laser-welded thereto against the first intermediate element;
placing the first intermediate element on the base plate;
adjusting the first optical component into the desired tilting position in relation to the first intermediate element by turning the second intermediate element with respect to the first intermediate element;
laser welding the first intermediate element and the second intermediate element in the desired tilting position at the third joining surface of the first intermediate element and the fourth joining surface of the second intermediate element;
adjusting the first optical component on the base plate into a desired position with respect to the base plate by moving the first intermediate element with respect to the base plate; and laser welding the first intermediate element to the base plate in the desired position at the first joining surface of the first intermediate element and the joining surface of the base plate,
wherein at least the joining surface of the first optical component, the joining surface of the base plate, the first joining surface and the third joining surface of the first intermediate element, and the second joining surface and the fourth joining surface of the second intermediate element are formed from materials for which a difference in their coefficients of thermal expansion is less than $10e^{-6}/K$.

14. A method for adjusting and fastening at least a first optical component of a pulse compressor comprising multiple optical components, at least one of which is a diffraction grating, on a base plate of the pulse compressor, the method comprising:
placing a first intermediate element and a second intermediate element onto the base plate;
laser welding a third intermediate element to the first optical component at a joining surface of the first optical component and a third joining surface of the third intermediate element;
positioning the third intermediate element against the first intermediate element and the second intermediate element;
adjusting the first optical component into a desired tilting position with respect to the base plate by turning the third intermediate element against the first intermediate element and the second intermediate element, and/or adjusting the optical component into a desired height position with respect to the base plate by changing a distance between the first intermediate element and the second intermediate element;
laser welding the first intermediate element to the third intermediate element at the desired tilting position at a first joining surface of the first intermediate element and a fourth joining surface of the third intermediate element;
laser welding the second intermediate element to the third intermediate element at the desired tilting position at a second joining surface of the second intermediate element and a fifth joining surface of the third intermediate element; and
laser welding the first intermediate element and the second intermediate element to the base plate in the desired height position at a joining surface of the base plate, a sixth joining surface of the first intermediate element and a seventh joining surface of the second intermediate element,
wherein at least the joining surface of the first optical component, the joining surface of the base plate, the first joining surface and the sixth joining surface of the first intermediate element, the second joining surface and the seventh joining surface of the second intermediate element, and the third joining surface, the fourth joining surface, and the fifth joining surface of the third intermediate element are formed from materials for which a difference in their coefficients of thermal expansion is less than $10e^{-6}/K$.

* * * * *